United States Patent
Asayama et al.

(10) Patent No.: US 9,045,009 B2
(45) Date of Patent: Jun. 2, 2015

(54) SET OF PNEUMATIC TIRES AND AN ARRANGEMENT OF MOUNTING PNEUMATIC TIRES

(71) Applicant: TOYO TIRE & RUBBER CO., LTD., Osaka-shi, Osaka (JP)

(72) Inventors: Yoshinori Asayama, Osaka (JP); Tetsuji Miyazaki, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 140 days.

(21) Appl. No.: 13/861,077

(22) Filed: Apr. 11, 2013

(65) Prior Publication Data

US 2013/0269845 A1 Oct. 17, 2013

(30) Foreign Application Priority Data

Apr. 11, 2012 (JP) ................................ 2012-090345

(51) Int. Cl.
*B60C 11/03* (2006.01)
*B60C 1/00* (2006.01)
*B60C 19/00* (2006.01)

(52) U.S. Cl.
CPC ............ *B60C 11/03* (2013.01); *B60C 1/0016* (2013.04); *B60C 2011/0025* (2013.04); *B60C 19/001* (2013.01)

(58) Field of Classification Search
CPC .. B60C 19/001; B60C 11/03; B60C 11/0008; B60C 11/0041; B60C 1/0016; B60C 2011/0008; B60C 2011/0016; B60C 2011/0025; B60C 2011/0083; B60C 2011/0327; B60C 2011/0344; B60C 2200/04

USPC ............... 152/904, 905, 209.1, 209.2, 209.3, 152/209.5
See application file for complete search history.

(56) References Cited

U.S. PATENT DOCUMENTS 3,515,197 A * 6/1970 Boileau ......................... 152/535
3,830,275 A * 8/1974 Russell ....................... 152/209.5
4,478,266 A * 10/1984 Pierson et al. ............. 152/209.5

FOREIGN PATENT DOCUMENTS

| JP | 63-301108 A | 12/1988 |
| JP | 03-197205 | * 8/1991 |
| JP | 06-143927 | * 5/1994 |

(Continued)

OTHER PUBLICATIONS

Japanese Office Action dated Jul. 30, 2013 in corresponding Japanese Application No. 2012-090345, with English translation. (3 pages).

*Primary Examiner* — Eric Hug
(74) *Attorney, Agent, or Firm* — Westerman, Hattori, Daniels & Adrian, LLP

(57) ABSTRACT

A set of pneumatic tires that are mounted on a vehicle such as a compact or subcompact car, and to an arrangement of mounting the pneumatic tires on the vehicle, which enable omitting of tire rotation without adversely affecting productivity and performances of the tires. Dimensions, shaping and contour as well as tread pattern of the tires for the drive wheel are identical or substantially identical with those for the non-drive wheels. And, wear resistance of the tires for the non-drive wheels is lower than that for the drive wheels due to discrepancy in rubber compositions for forming tire treads between the tires for drive and non-drive wheels. The wear resistance may be defined as a mileage per 1 mm wear in depth direction of grooves on the tire tread around its center line.

10 Claims, 1 Drawing Sheet

(56) References Cited

FOREIGN PATENT DOCUMENTS

| JP | 08-188015 | * | 7/1996 |
| JP | 11-321237 A | | 11/1999 |
| JP | 2008-260423 A | | 10/2008 |
| JP | 2010-195385 A | | 9/2010 |
| JP | 2012-6414 A | | 1/2012 |
| JP | 2012-035823 | * | 2/2012 |
| JP | 2012-35823 A | | 2/2012 |

\* cited by examiner

SET OF PNEUMATIC TIRES AND AN ARRANGEMENT OF MOUNTING PNEUMATIC TIRES

BACKGROUND OF THE INVENTION

Present invention relates to a set of pneumatic tires that are mounted on a vehicle such as a compact, subcompact or Kei car or other passenger car, and to an arrangement of mounting the pneumatic tires on such vehicle. The invention especially relates to the set of tires and tire-mounting arrangement, in which tires on drive wheels are shaped as same as tires on non-drive or trailer wheels.

Conventionally, on a typical passenger car such as a compact, subcompact or Kei car, tires that are identical with each other are mounted on wheels of the vehicle and are exchanged with each other in a rotational manner at an adequate timing. For example, at a time an accumulated mileage reaches a predetermined value, swapping of the tires is made between front and rear wheels and between right-hand and left-hand wheels, so as to alleviate variation among extent of wearing of the tires. Timely rotation of the tires would smoothly take away unevenness in amounts of wear and damage of the tires, which would otherwise varied by positions of the wheels.

Thus, most of proposals for reducing the variation of wear, which have been made to date, require the tire rotation as a prerequisite. For example, JP2010-195385A (Japan patent application publication No. 2010-195385) proposes designing of tread pattern so that developing of the wear makes the tread pattern eventually in a right-left symmetry in order to enable the rotation of tires even having non-symmetric tread patterns.

According to a tire proposed in JP1988(S63)-301108A, orientation of tread pattern is opposite between tires mounted on right-hand and left-hand wheels. Nevertheless, as shown in FIG. 1 of JP1988(S63)-301108A, the tire rotation is enabled and seems to be required as a prerequisite.

According to a tire proposed in JP2008-260423A, tires on front wheels are "provided with high friction coefficient to road surface so as to increase accelerating and braking performances" (paragraph 0050); and rear wheels are given with some camber angle as shown in FIG. 4, and tires on the rear wheels are "provided with lower friction coefficient to road surface so as to improve fuel efficiency" (paragraph 0050). In ways to decrease the friction coefficient, it is described as follows: "as a first method, width of the tire is decreased; as a second method, adopted is a tire material having smaller friction coefficient; as a third method, adopted is a tread pattern that decreases friction coefficient of the tread; and as a fourth method, increased is an inner pressure of the tires". Whereas in the JP2008-260423A, a detailed embodiment is disclosed in respect of manner of controlling the camber angles on course of running of the vehicle, no disclosure is made on how and what extent the camber angles are given and on how to tackle problems related to the tire rotation.

Meanwhile, JP1999(H11)-321237A discloses a pneumatic radial tire that "has higher stiffness in rubber material on a part at outside of a vehicle than that at inside". This is to cope with a problem that: "center of gravity of a minivan vehicle or of one-box design vehicle is in higher position than that of a sedan vehicle; a large load is applied to the part at outside of the vehicle; and proceeding of wear is more rapid at the outside of the vehicle than at the inside".

BRIEF SUMMARY OF THE INVENTION

A pneumatic tire according to the invention comprises: a pair of tires for drive wheels and a pair of tires for non-drive wheels; wherein dimensions, shaping and contour as well as tread pattern of the tires for the drive wheels are identical or substantially identical with those for the non-drive wheels; and wear resistance of the tires for the non-drive wheels is lower than that for the drive wheels due to discrepancy in rubber compositions for forming tire treads between the tires for drive and non-drive wheels. Optimum or adequate extent of the difference or discrepancy varies, for example by overall construction of the vehicle.

DETAILED DESCRIPTION OF THE INVENTION

Figure 1:
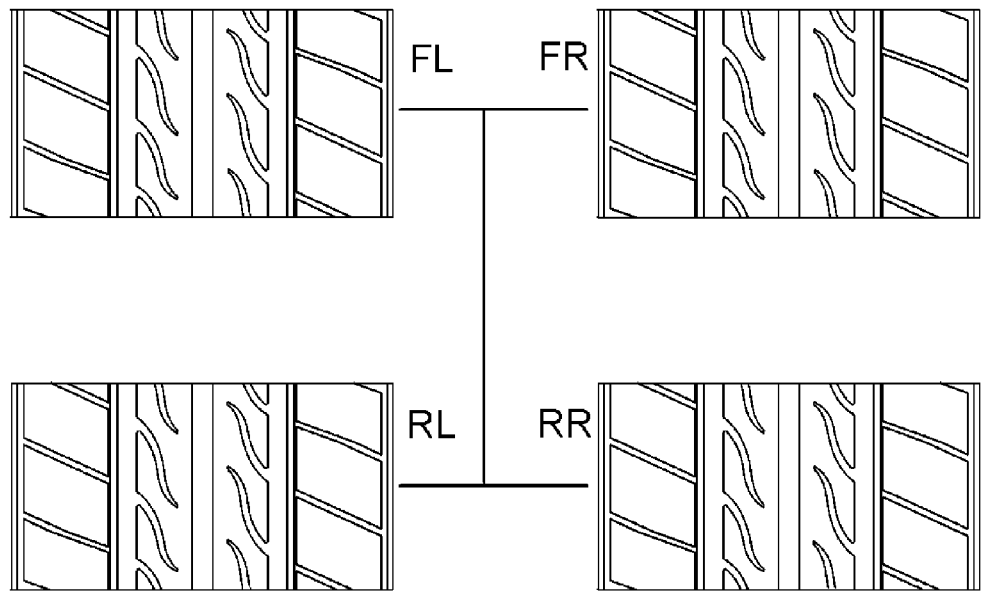
FIG. 1 shows an example of tread patterns for a set of pneumatic tires on a vehicle, in which each of the tread patterns is symmetrical and the tread patterns are identical with each other.

The inventor has earnestly investigated on arrangement of the tires on a vehicle and realized following. Every set of tires having been on sale requires the tire rotation. For a usual housewife or aged person, it is troublesome and costly to leave his or her vehicle in a care of a repair shop to make the tire rotation. And, thus he or she would prefer to avoid the tire rotation. It is hence assumed that running of the vehicle would be continued without making the tire rotation properly; and maneuvering stability would consequently be compromised. A reason why no set of tires having been on sale enables omitting of the tire rotation is presumed as follows: it has been believed that production efficiency and/or performances of the tires are adversely affected by such a manner of designing.

In view of the above, the inventor has investigated to find a way to eliminate a need of the tire rotation and has tried varying of components and/or ratios of the components in rubber composition for forming the tire tread, among the tires on a vehicle, without altering overall shaping and tread pattern of the tires such as widths of the tires. Consequently, it has been found that such varying would rather easily eliminate discrepancy in extent of wear of the tire treads, between the tires on drive wheels and on non-drive wheels; and no significant adverse effect is arisen; so as to complete the invention.

In present application, the wear resistance of the tire is determined by a tire drum testing of the pneumatic tire or by an on-track testing of the tire, which is mounted on a same position of the vehicle. In particular, the wear resistance would be expressed as a travelling distance in a period of developing the wear by 1 mm in a depth direction of grooves on the tread; or as a ratio or index based on thus measured travelling distances. In an embodiment, when the wear resistance of the tires on drive wheels is taken as 100, the wear resistance of the tires on non-drive wheels would be not more than 98, preferably be not more than 96, more preferably be not more than 94 and further preferably be not more than 92; and would be no less than 80, preferably be no less than 83, more preferably be no less than 85 and further preferably be no less than 87.

The wear resistance of the tire is considered to depend on rubber hardness of vulcanized rubber that forms the tire tread. The rubber hardness here and hereafter means durometer hardness with "Type A", measured at 23° C. in accordance with JIS K 6253. The wear resistance of the tire may also depend on abrasion resistance of rubber disc specimen, measured in accordance with JIS K 6254. The wear resistance tends to increase when the abrasion resistance increases.

An arrangement of mounting pneumatic tires on a vehicle according to the invention is for mounting the tires on drive wheels and non-drive wheels, on a compact or subcompact car or a Kei car that has a displacement up to 660 cc and 64 PS, or on other passenger car. In the arrangement, dimensions, shaping and contour as well as tread pattern of the tires for the drive wheel are identical with those for the non-drive wheels; and rubber composition for forming the tire treads for drive wheels differs from that for non-drive wheel so that wear resistance of the tires for drive wheels is higher than that for non-drive wheels; and thereby, extent of wear of the tires for drive wheels is set to be substantially same with that for non-drive wheels.

What is meant by substantially same extent of wear is that extent of developing wear is substantially same when the tires are mounted respectively on wheels of prescribed positions, on a compact car or other passenger car, and subjected to standardized on-road test on a track for testing the wear. In particular, when the extent of wear resistance is expressed as a mileage per 1 mm wear; substantially same extent of wear means that difference of extent of the wear resistance between the tires for drive wheels and for non-drive wheels is no more than 5%, for example, on basis of larger one among two values of the mileages. More particularly, it is meant that the difference of extent of wear resistance is no more than 3%. The mileage per 1 mm wear means a distance traveled by the tire within a period, during which 1 mm of wear in depth direction of main grooves is developed on tire tread in vicinity of its center line. Hereafter, such mileage of the track test, corresponding 1 mm wear in depth direction of the grooves, by mounting each of the tires on a respective predetermined position of the vehicle is referred as actual on-vehicle per-wear mileage.

The invention enables to save user's labor for the tire rotation. Moreover, by keeping even extent of wear among the tires, maneuvering stability and fuel efficiency are improved. In addition, it is allowed to set lower rubber hardness for the tire treads for non-drive wheels so as to improve tire's grip on road surface, and particularly to improve maneuvering stability on wet road.

In a preferred embodiment, the set of tires and their arrangement according to the invention are for a small sedan passenger car having displacement not more than 2000 cc, a compact or subcompact car, or a City car or Kei car, and are especially for a compact or subcompact car. In a preferred embodiment, each tire has three main grooves that are continuous or partly intermittent in tire circumferential direction, and thus has more than four rows of land parts.

In the set of tires and their arrangement according to the invention, all the tires are identical or substantially identical with each other in respect of dimensions, shaping or overall contour, and tread pattern. Difference among the tires resides only in discrepancy in rubber composition for forming the tire tread. In a preferred embodiment, all the tires are totally identical in respect of dimensions, shaping and tread pattern. Moreover, in a preferred embodiment, rubber compositions of tires for right-hand and left-hand wheels are identical with each other, in regard of drive wheels and non-drive wheels. Further, in a preferred embodiment, tread patterns of all the tires have identical orientation when mounted on a vehicle.

In a preferred embodiment, the discrepancy in rubber composition resides in discrepancy in ratios among components; as a way to cause discrepancy in wear resistance of vulcanized rubber itself between the tire treads for drive and non-drive wheels. For example, it is assumed that rubber component in the composition is formed of two kinds of diene rubbers, one of which contributes to wear resistance but degrade the grip on road. Then, ratios between such two kinds of diene rubbers are modified to cause discrepancy in the wear resistance. Alternatively, percentages or ratios of fillers, such as carbon black and/or silica, in the composition are modified to cause such discrepancy. In other preferred embodiment, styrene butadiene rubber having high glass transition temperature (Tg) is included only in the rubber composition of tire treads for drive wheels; or fillers or grades of fillers, such as grades of carbon blacks, are so selected to cause discrepancy between tire treads for non-drive and drive wheels as a way to cause the discrepancy in the wear resistance.

In a preferred embodiment, the discrepancy in wear resistance of tire tread itself is materialized by discrepancy in rubber hardness measured with the durometer hardness of "Type A" in accordance with JIS K 6253, and/or by discrepancy in the abrasion resistance of rubber disc specimen measured in accordance with JIS K 6254, which is hereafter referred as rubber-disc abrasion resistance. For example, when rubber component for the tire tread is formed of styrene butadiene rubber having higher glass transition temperature (Tg) and butadiene rubber; percentage of the styrene butadiene rubber may be increased for the tire treads for non-drive wheels so as to increase the rubber hardness of JIS K 6253 and the rubber-disc abrasion resistance of JIS K 6254 as compared to the tire treads for drive wheels and to thereby increase wear resistance of the tire treads themselves for non-drive wheels compared to those for drive wheels. Please be noted that the wear resistance of the tire tread itself differs from the actual on-vehicle per-wear mileage described later.

In a preferred embodiment, discrepancy in rubber hardness between tires for drive and non-drive wheels may be set as not less than 3, in particular not less than 5, and not less than 8 for example; and not more than 20, in particular not more than 15, and not less than 12 for example. Meanwhile, discrepancy in the rubber-disc abrasion resistance of JIS K 6254 may be set, on basis of the abrasion resistance for drive-wheel tires, as not less than 3%, in particular not less than 5%, and not less than 8% for example; and not more than 20%, in particular not more than 15%, and not less than 12% for example.

In a preferred embodiment, a relatively small discrepancy in the wear resistance is given between the tires on right-hand and left-hand wheels, in regard of drive wheels and/or non-drive wheels; and this discrepancy is smaller than that between a drive-wheel tire and a non-drive-wheel tire. In particular, the discrepancy in the wear resistance between right-hand and left-hand wheel tires may be set, on basis of the discrepancy between drive-wheel and non-drive-wheel tires, at no more than 50%, in particular no more than 40%, and no more than 30% for example; and at no less than 5%, in particular no less than 10%, and no less than 20% for example.

In other preferred embodiment, a negative camber is set at drive wheels and/or non-drive wheels, or in particular at least at non-drive wheels; and, each of the tires on the wheels having the negative camber is so constructed that the wear resistance is higher at part, of the tire tread, on inside of the vehicle than on outside. The wear resistance used here means a value measured in same manner as above-mentioned wear resistance of the tire and may be referred as tire's partial wear resistance. A boundary between higher-wear-resistance part on the inside and lower-wear resistance part on the outside may typically be center line of the tire tread; but may be adjusted to deviate from the center line in accordance with camber angle or other circumstance. The boundary as an interface may run obliquely in a tire's cross section along a rotational axis of a tire, as in JP1999(H11)-321237A.

In particular, discrepancy in wear resistance between the inside and the outside of a vehicle may be, on basis of the discrepancy from drive-wheel tires to non-drive-wheel tires, set at no more than 50%, in particular no more than 40%, and no more than 30% for example; and at no less than 5%, in particular no less than 10%, and no more than 20% for example. Camber angle of the negative camber may be set at no less than 0.5 degree, in particular no less 1 degree, and no less than 1.2 degree for example; and at no more than 5 degrees, in particular no more than 3 degrees, and no more than 2 degrees for example.

In a preferred embodiment, marking is given to outer face on a sidewall of each tire in the set of tires to indicate whether the tire is for drive wheels or for non-drive wheels. The marking may be formed by engraving with inner contour of tire-forming tool or providing a white rubber portion on the inner contour, or by printing or labeling. If some discrepancy is given between the outside and the inside of a tire or between right-hand and left-hand wheel tires, a marking to indicate such may be given to a sidewall of the tire.

EXAMPLES

Examples of the invention are explained in following and are by no way construed to restrict the invention.

A set of test tires consisting of a pair of drive-wheel tires and a pair of non-drive wheel tires were prepared in a manner that: there is provided with discrepancy in rubber compositions, especially in ratios of components in the compositions, between each drive-wheel tire and each non-drive wheel tire. This set of test tires is taken as Example 1. Sets of test tires for Comparative Examples 1 and 2 are also prepared. Throughout the Example and the Comparative Examples, all the tires are totally identical with each other in respect of dimensions, shaping and tread patterns. Namely, in respect of these, a drive-wheel tire is same with a non-drive wheel tire; a right-hand wheel tire is same with a left-hand wheel tire; a tire in the Example is same with a tire in each of the Comparative Examples 1 and 2.

Each rubber composition for the Example and the Comparative Examples 1 and 2 is formed of: 100 weight parts of rubber component, which is consisting of styrene butadiene rubber and high-cis butadiene rubber; about 40 weight parts of oil; about 50 weight parts of carbon black as well as about 50 weight parts of silica filler; and sulfur, vulcanization accelerator and antioxidant. Ratios between the styrene butadiene rubber and high-cis butadiene rubber, as well as amounts of oil, carbon black and silica fillers, were so adjusted that target values of the rubber hardness on Table 1 are attained.

It was confirmed that the target values of the rubber hardness of JIS K 6253 (Type A at 23° C.) have been attained. Then, tests in below were made.

Test vehicle: a front-wheel drive compact car having displacement of 1300 cc;
Size of test tires: 175/65R14;
Actual on-vehicle per-wear mileage: On a wear-test track owned by the applicant company, running of the vehicle was intermittently continued at a standard speed of 60 km/hr, without making the tire rotation. At every stopping, extent of wear at main grooves was measured. And, a mileage per 1 mm wear in depth direction was obtained. Each of obtained results is shown in Table 1 at below, by an index taking the value for Example 1 as 100.
Maneuvering stability on wet road: A sensory evaluation was made by running the vehicle on a test track for maneuvering stability, immersed with 2-mm depth of water. Obtained results are shown in Table 1 by taking, as 100, a value obtained by a reference test, in which average and identical tire was mounted on each wheel of the test vehicle and evaluated in same manner. Namely, on each of drive wheels and non-drive wheels of the test vehicle, an identical tire having rubber hardness of 70 was mounted; sensory evaluation on the maneuvering stability was made; and thus obtained evaluation value was taken as 100 or basis for index.

TABLE 1

|  | Comp. Ex. 1 | Comp. Ex. 2 | Ex. 1 |
| --- | --- | --- | --- |
| Rubber hardness JIS K 6253, 23° C. | | | |
| Tire treads for Drive wheels | 75 | 65 | 75 |
| Tire treads for Non-drive wheels | 75 | 65 | 65 |
| Actual on-vehicle per-wear mileage | | | |
| Tire treads for Drive wheels | 100 | 80 | 100 |
| Tire treads for Non-drive wheels | 120 | 100 | 100 |
| Maneuvering stability on wet road | 90 | 110 | 105 |

In Example 1, the rubber hardness of drive-wheel tires was set to be moderately higher than that of non-drive-wheel tires. By such and some minor modification, rate of developing wear on drive-wheel tires was equalized with that on non-drive-wheel tires. Moreover, maneuvering stability on wet road was somewhat improved, compared with above-mentioned reference test, in which average and identical tire was mounted on each of drive and non-drive wheels.

In Comparative example 1, a tire identical with the drive-wheel tire of Example 1 was mounted on each of drive and non-drive wheels. As a result, overall wear resistance measured as the actual on-vehicle per-wear mileage was sufficient whereas rate of developing wear on the drive-wheel tires was higher than that on the non-drive wheel tires. Thus, the tire rotation was required. Moreover, the maneuvering stability was lower than that of the reference test, in which an average tire was mounted on each wheel, because the rubber hardness for each tire was larger than the reference test.

In Comparative example 2, a tire identical with the non-drive-wheel tire of Example 1 was mounted on each of drive and non-drive wheels. As a result, rate of developing wear on the drive-wheel tires was considerably higher than that on the non-drive wheel tires. Thus, the tire rotation was also required. Nevertheless, the maneuvering stability was higher than that of the Example 1 because the rubber hardness for each tire was relatively low.

Figure 2:
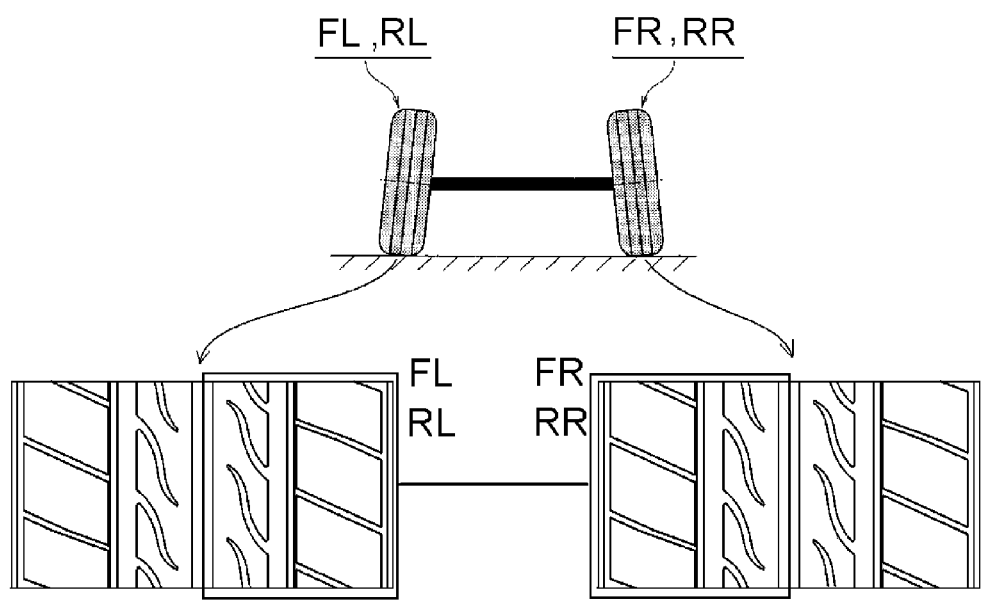
FIG. 2 shows a schematic illustration of setting a negative camber to wheels.

Hereafter, Example 2 is explained in conjunction with FIG. 2. In Example 2, about 1.3 degrees of negative camber was set to each of drive and non-drive wheels on the above-mentioned compact car. Overall setting for each tire was as substantially same with that in the Example 1; and the wear resistance on inside of vehicle was set to be higher than that on outside. In a detailed example, outer half of the tire tread, as a part outer than center line of the tire tread, is same with respective tire tread in Example 1. In more detail, outer-half of the tire tread of each drive-wheel tire has the rubber hardness of 75; outer-half of the tire tread of each non-drive-wheel tire has the rubber hardness of 65; inner-half of the tire tread of each drive-wheel tire has the rubber hardness of 77; and inner-half of the tire tread of each non-drive-wheel tire has the rubber hardness of 67.

Achieved by Example 2 were: not only equalizing of rates of development of wear, between a drive-wheel tire and non-drive wheel tire; but also somewhat improvement in overall values of the actual on-vehicle per-wear mileage. Moreover, the maneuvering stability on wet road, achieved by Example 2, was somewhat higher than that of Example 1.

Reference characters: FL front-left wheel; FR Front-right wheel; RL Rear-left wheel; RR Rear-right wheel.

What is claimed is:

1. A set of pneumatic tires for a vehicle, comprising: a pair of tires for drive wheels and a pair of tires for non-drive wheels;
    wherein dimensions, shaping and contour as well as tread pattern of the tires for the drive wheel are identical or substantially identical with those for the non-drive wheels; and
    wear resistance of the tires for the non-drive wheels is lower than that for the drive wheels due to discrepancy in rubber compositions for forming tire treads between the tires for drive and non-drive wheels; and
    wherein the wear resistance is expressed as a mileage per wear of 1 mm in depth direction of grooves on tire tread, as determined by a tire drum testing of the pneumatic tire or by an on-road testing of the tire as mounted on a same position of the vehicle; and
    when the wear resistance of the tires for drive wheels is taken as 100, the wear resistance of the tires for non-drive wheels is not more than 98 and is no less than 80.

2. The set of pneumatic tires according to claim 1, for a vehicle having negative camber on the non-drive wheels and/or the drive wheels, wherein tire tread of each tire, which is to be mounted on a negative-cambered wheel, has discrepancy in wear resistance between a part, which comes to outside when mounted on a vehicle, and a part that comes to inside when mounted on the vehicle; the wear resistance of the part on inside is higher than the wear resistance of the part on outside; and the discrepancy in the wear resistance between the parts on outside and inside is set to be smaller than discrepancy in the wear resistance between the tire on the drive wheel and the tire on the non-drive wheel.

3. The set of tires according to claim 1,
    wherein discrepancy in the wear resistance expressed by the mileage per wear of 1 mm in depth direction of grooves on tire tread, between tires for right-hand wheel and left-hand wheel, is no more than 50% and no less than 5%, of the discrepancy between the drive wheel and the non-drive wheel.

4. The set of tires according to claim 3, wherein the tire tread of each of the tires for wheels, which have negative camber of no less than 0.5 degree and no more than 5 degrees, has a part on outside and a part on inside when mounted on the vehicle, and the part on inside has the wear resistance higher than the part on outside; and discrepancy in the wear resistance expressed by the mileage per wear of 1 mm in depth direction of grooves on tire tread, between the part on outside and the part on inside, is no more than 40% and no less than 5%, of the discrepancy between the drive wheel and the non-drive wheel.

5. The set of tires according to claim 4, wherein a boundary between the part on outside and the part on inside is arranged in vicinity of a center line of the tire tread.

6. The set of tires according to claim 1, wherein rubber hardness, which is measured at 23° C. by Type A of JIS K 6253, of the tire treads of tires for non-drive wheels is smaller than that for drive wheels, by no less than 3 and no more than 20.

7. The set of tires according to claim 6, wherein rubber disc abrasion resistance according to JIS K 6264, of the tire treads of tires for non-drive wheels is smaller than that for drive wheels, by no less than 3% and no more than 20%, of a value of the disc abrasion resistance of the tire treads for drive wheels.

8. A tire-mounting arrangement on drive wheels and non-drive wheels of a compact passenger car or other vehicle, wherein dimensions, shaping and contour as well as tread pattern of the tires for the drive wheels are identical or substantially identical with those for the non-drive wheels; and wear resistance of the tires for the non-drive wheels is lower than that for the drive wheels due to discrepancy in rubber compositions for forming tire treads between the tires for drive and non-drive wheels, and wherein, when a mileage per wear of 1 mm in depth direction of grooves on tire tread is measured by mounting the tires on respective wheels on prescribed positions of the vehicle; then, discrepancy in such mileages in the prescribed positions, between the drive wheel and the non-drive wheel, is no more than 5% on basis of larger one among the mileages in the prescribed positions.

9. The tire-mounting arrangement according to claim 8, wherein the wear resistance is expressed as a mileage per wear of 1 mm in depth direction of grooves on tire tread, as determined by a tire drum testing of the pneumatic tire or by an on-road testing of the tire as mounted on a same position of the vehicle; and
    when the wear resistance of the tires for drive wheels is taken as 100, the wear resistance of the tires for non-drive wheels is not more than 98 and is no less than 80.

10. The tire-mounting arrangement according to claim 9, wherein discrepancy in the wear resistance expressed by the mileage per wear of 1 mm in depth direction of grooves on tire tread, between tires for right-hand wheel and left-hand wheel, is no more than 50% and no less than 5%, of the discrepancy between the drive wheel and the non-drive wheel.

* * * * *